United States Patent Office

3,026,277
Patented Mar. 20, 1962

3,026,277
PROCESS FOR PREPARING MOLDING COMPOSITION COMPRISING ALDEHYDE CONDENSATION PRODUCT AND NON-IONIC SURFACE ACTIVE AGENT
Joseph I. Gerko, Raritan, N.J., assignor to American Cyanamid Company, New York, N.Y., a corporation of Maine
No Drawing. Filed Dec. 12, 1958, Ser. No. 779,818
17 Claims. (Cl. 260—17.3)

This invention relates to pigmented, fibrous-filled aminoplast molding compositions. More particularly, this invention concerns an economical process for the production of fibrous-filled molding compositions based on thermosetting amino-aldehyde condensates wherein effective dispersion of additives, including pigments, is accomplished by wet-mixing the additives with the resinous impregnated fibrous filler in the presence of a non-ionic surface active agent.

An object of this invention is to economically prepare pigmented, amino-aldehyde molding compositions suitable for producing molded articles having desirable surface appearance and color uniformity.

A more specific object of this invention is to provide a process for compounding pigmented amino-formaldehyde molding compositions wherein no grinding or dry blending operations are required to effect proper admixing of the components of the composition.

These and other objects of this invention will be more completely understood by those skilled in the art upon consideration of the detailed discussion and specific examples set forth hereinbelow.

Amino-aldehyde condensates are presently regarded as unexcelled resinous molding compounds for the preparation of decorative type molded articles. This is obviously borne out by the widespread and almost exclusive use of these molding compounds in applications such as dinnerware, telephone handsets, home appliances and the like, where good decorative appearance is a prime consumer requirement. While the bright, clear colors invariably observed for molded articles of this type may be qualities to some extent inherent in nature of the molding compound, the uniformity of color and surface appearance thereof are properties fundamentally imparted by the manner of preparing or compounding the molding composition. Accordingly, the essence of my invention concerns a novel and improved process for preparing decorative type molding compositions derived from amino-aldehyde molding compounds.

A decorative molding composition of the type with which this invention is concerned comprises an amino-aldehyde condensation product which has been carried to an intermediate stage of condensation whereby it remains as a soluble material, generally water soluble, but nevertheless capable, under certain conditions, of being converted to a substantially insoluble and infusible stage. Such a composition also includes a filler, preferably a fibrous type, whose presence in the molded article largely accounts for the mechanical strength characteristics of the article. Supplementing the said resinous molding compound and filler components are the omnipresent additives. These include a mold lubricant, colorants or opacifiers and a curing catalyst which facilitates the conversion of the molding compound to an infusible and insoluble state.

The prior art method commonly used to compound the various components indicated above consists of impregnating a cut or shredded fibrous filler with an aqueous solution of an amino-aldehyde condensate and thereupon drying the impregnated filler in contact with hot air to yield a coarse granular material referred to in the art as "pop corn." To this pop corn are added the various additives mentioned above and the mixture ground and blended in a single operation. The purpose of the grinding and blending operation is to grind the pop corn to fine particle size and at the same time uniformly blend the various additives, particularly the pigment, therewith. After the grinding and blending operation, the molding composition is then invariably densified and subsequently granulated. These latter operations are essentially practical requirements. Densification is necessary because molding compositions which are bulky are undesirable in that they necessitate the use of large molds which are costly to construct. Granulation is required in order to facilitate the handling of the composition by the molder.

In the preparation of a high grade decorative type molding composition according to the prior art method described hereinabove, a ball-milling process for grinding the pop corn and blending the additives therewith is universally practiced. A ball-mill is a rotable drum-like piece of equipment which carries a charge of flint or porcelain balls of like or of varying diameters. The mill is ordinarly filled to a depth of about ½–⅔ of its diameter with these balls. The material to be comminuted fills the interstices between the balls and part of the free space above. As the mill rotates all of the balls are set in motion and a substantial portion of the molding composition and balls rises along the wall of the drum to the top and cascades over the remaining portion. It is this type of action that permits the ball-mill process to concomitantly grind and blend in a single operation.

There are several reasons why ball mills are preferred for use in the process of preparing molding compositions. Undoubtedly the most important reason for the widespread use of ball mills in this art is that this method represents the most effective way hitherto known of accomplishing the blending of the molding composition. Other reasons ascribed for the popularity of ball mills are their low cost of maintenance and ease of operation. However, any such economies afforded by the use of this type of equipment are more apparent than real. For proper grinding and blending of the molding composition, relatively long residence time in the mill is ordinarily required. Since a ball mill has a practical limit in size, it is necessary to operate with a battery of mills in order to efficiently utilize the potential output of the sequential steps leading up to preparation of the pop corn. Consequently, it becomes manifest that a ball mill installation and the operation of same can be and is in fact a costly factor in the commercial preparation of a molding composition.

The practice of the present invention permits the preparation of decorative molding compositions without resorting to the use of a ball-mill operation. Furthermore, my novel process does not require any type of grinding or dry blending to effect proper distribution of the components of the composition. In accordance with this invention, a fibrous filler is impregnated with an aqueous solution of an amino-aldehyde condensate in the same manner employed in the prior art practice. However, in contradistinction to the prior art method the various additives are then added to the impregnated filler. I have discovered that if a non-ionic surface active agent is present at this point in the wet composition, mere physical mixing of the composition will effect proper dispersion of the additives throughout the molding composition. After homogeneously mixing, the composition is then dried in a conventional manner, densified and then finally granulated.

As alluded to hereinabove, an essential feature of this invention resides in the use of an effective surface active agent during the mixing of the additives with the impregnated filler. The surface active agents found to be suitable are those of the non-ionic type. The non-ionic character of these wetting or dispersing agents appears to constitute a critical feature which permits the successful practice of my invention. In this regard, representative types of cationic and anionic classes of surface active agents which otherwise may be regarded as having significant wetting or dispersive characteristics have been found unsuitable for use in this manner.

Of the known classes of surface active agents, the non-ionic type constitute the smallest class thereof. This particular class has been further subclassified as synthetic compounds corresponding to (a) products prepared by autocondensation of fatty matters and their derivatives with alkylene oxide, specifically ethylene oxide. The fatty matters include such as fatty acids, alcohols, esters, aldehydes, amines, etc., and (b) products obtained by condensation of phenolic compounds having lateral side chains with an alkylene oxide. Representative members of the foregoing subclasses which are useful in the practice of the instant invention include the alkylene oxide, specifically ethylene oxide, condensates of such materials as: an alkyl phenol, e.g., isooctyl phenol, isononyl phenol and the like; essentially saturated fatty acids, e.g., tall oil fatty acids and the like; higher fatty acid monoesters of an aliphatic polyhydric alcohol, e.g., sorbitan monopalmitate, sorbitan mono-oleate and the like; the higher fatty amines, e.g., stearamide and the like; long chain alcohols, e.g., tridecanol and the like; etc.

The above listing generically identifies the various surface active agents contemplated in this invention. Specific agents corresponding to these general types are represented by a host of proprietary products commercially available which need not be specifically enumerated here. A comprehensive listing and identification of commercially available non-ionic agents may be found in "Surfactants Listed" by John W. McCutcheon, copyrighted 1958, Mac-Nair-Dorland Co., Inc.

The amount of non-ionic wetting agent to be used may vary over a range from about 0.5 to 2.0% based on the total weight of solid resin and filler combination. On this basis, the preferred range of surfactant is from about 0.2 to 0.5%. The impregnated filler and additives, including the non-ionic wetting agent, are then mixed and blended by simple mixing action until homogeneity is obtained. The mixing operation is ordinarily carried out at an elevated temperature with the preferred range for the ingredients being from about 100 to 150° F. The time of mixing is not critical and a period of as low as 30 minutes has been found suitable for obtaining homogeneous blending of the various ingredients. No specific limits as regards time can be stated for this operation because an optimum time depends upon the type of particular resinous material employed in the composition and particular end use of the molding composition. In general, the best procedure to follow in arriving upon a suitable period for mixing the ingredients is to preliminarily determine the minimum time required for mixing a small trial batch of a composition containing the particular type of resin employed. Such periods are in turn identically applicable to large production batches of the same composition. Extended periods of mixing, that is, periods which are longer than necessary for obtaining homogeneity are only objectional in that they may adversely affect other properties of the compositions such as plasticity and set rate of the final material. After suitable mixing has been achieved, the composition is then introduced into a dryer, preferably a continuous type, wherein the material is dried to a predetermined volatile content. The volatile content of the material as introduced into the dryer is usually within the range of from about 25% to about 45% by weight. The molding composition is then dried to a maximum volatile content in the order of approximately 8%. Preferably, the volatile content of molding compositions to which this invention relates should be maintained as close as possible to around 6%. A suitable temperature that may be employed in a continuous dryer to effect the above stated desiccation is from about 180–200° F. dry bulb and from about 80° F. to about 140° F. wet bulb.

After the material leaves the drier it is then densified. It is preferred that the densified material possess a specific gravity of at least 1.0. Since densification is accomplished in my process in the pop corn stage, very high rates can be achieved. Therefore, this in an additional advantage to be realized in my invention whereas in the conventional processes the material to be densified is of a comparatively bulky nature as a result of extensive grinding. The dried pop corn should be densified sufficiently (e.g., S.G.=1.0–1.3) so that when it is ultimately cut to the desired granular size, the composition will exhibit an apparent density of at least 0.4 and preferably greater than about 0.5. The method for determining apparent density is described in ASTM Section D–1182–54.

Densification can be carried out in any one of a number of suitable methods known in the art. Thus one may use standard preform machines, mixers such as the Banbury mixer or conventional roll densifiers. Following the densification step, the densified material is then granulated to a suitable size which permits the molding composition to flow readily and thus be in condition for proper handling by the molder. As is understood by those skilled in the art, a molding composition regarded as having proper granular properties does not contain uniform size particles. Present methods for granulating results in products ranging in size from about 44 to 1500 microns. It is preferred to have a substantial portion of the product, that is, in the order of 90%, distributed in size between about 177 and 1000 microns. Thus, in the practice of my invention wherein granulation is practiced, it is contemplated that the particle size distribution will conform to the above-stated standards which are ordinarily observed.

Since this invention concerns the preparation of decorative type molding composition, a filler forms an essential constituent of said compositions. The preferred type of filler is the fibrous type. Illustrative examples of fibrous type fillers are such as alpha cellulose, regenerated cellulose paper, wood flour, walnut shell flour and the like. The amount of filler employed will depend upon the ultimate use of the molding composition and the property sought and, therefore, may vary over wide ranges up to as high as 50% by weight, based on the total weight of the final molding composition. Preferably, the amount of filler based on the total weight of the molding composition is in the order of about 30% by weight.

The fibrous fillers used most extensively to prepare decorative type, molding compositions are of the cellulosic type which is particularly exemplified by alpha cellulose. Alpha cellulose is invariably received by the fabricator of the molding composition in sheet or roll form. The alpha cellulose may be introduced into the impregnator mixer as received. However, I prefer to cut or shred the alpha-cellulose prior to the impregnation step preliminary to the preparation of the pop corn. Cutting or shredding may be achieved by any of the conventional methods heretofore employed. From the foregoing, it is obvious that the degree to which the alpha cellulose is reduced in size is not critical with regard to this invention. A sophisticated approach in attempting to predetermine the effect of the filler size upon the proper dispersion of the additives in the instant process would induce one to believe that the more finely divided pulp or filler would tend to give better color uniformity of the composition. Oddly enough, however, I have found that compositions wherein the impregnated pulp had nominal sizes of $\frac{3}{32}''$ gave somewhat better compositions with regard to color uniformity than those in which the cut pulp had been hammer milled to a size corresponding to 60 mesh prior to the impregnation step. Therefore, it can be seen that the size of the cut pulp is not of particular importance in this invention and accordingly all of the conventional procedures employed in conditioning the sheet alpha cellulose may be used.

The pigments which may be used to prepare decorative molding compositions include a variety of industrial pigments which are customarily employed, encompassing all colors and various shades thereof. The term pigment as used herein and in the appended claims not only contemplates those organic and inorganic materials which are conventionally referred to in the strict sense of the word as pigments but also includes dye materials. The term pigment as employed herein also contemplates opacifiers such as titanium dioxide, zinc sulfide, zinc oxide and the like. Furthermore the process of this invention is not restricted to the use of those pigments which are regarded as being of the water-dispersible variety. All of the industrial pigments available for use in molding compositions are of comparatively minute sizes and, therefore, the problem of blending the pigment uniformly throughout the molding composition is strictly a physical one and no further reduction of the pigment particle size is required.

The amount of pigment employed in the preparation of molding compositions may range from as little as about 0.05% to as much as about 5% of the composition; rarely is an amount used which is significantly greater than the latter percentage figure. A generic designation of some of the multitude of colors that may be used are such as cadmium yellows, cadmium reds, chrome yellows, chrome greens, toluidine reds, lithol reds, iron oxides, ferrocyanides, phthalocyanide greens and blues, carbon and mineral blacks, ultramarine blues, rhodamine lakes, ferrite yellows, copper and aluminum powders, etc.

The mold lubricants conventionally employed in the compositions of this type, which are well known in the art, can be introduced in the mixer stage of my process. Alternately and preferably, the most conventionally used lubricant, namely, zinc stearate, may be incorporated or "dusted in" the final granulated product. Such a procedure is disclosed in application Serial No. 692,417, now Patent No. 2,919,160. Suitable mold lubricants are such as zinc stearate, glycol monostearate, ceresin, carnauba wax, montan wax, calcium stearate, zinc palmitate, etc. The lubricant as its name implies is present in the molding composition to facilitate the removal of the molded article from the mold. From about 0.01% to 5% by weight of the lubricant based on the total weight of the composition is generally a sufficient amount. The preferred amount of lubricant is from about 0.3% to about 2.0%.

An acid catalyst for facilitating the conversion of the thermosetting resinous product to an infusible insoluble product is desirable in the composition and is also incorporated into the composition in the mixing stage of my process. Any acid catalyst may be employed for this purpose. They include inorganic acids e.g., phosphoric acids; organic acids e.g., phthalic anhydride, hexachloro phthalic anhydride, maleic anhydride, fumaric acid, adipic acid, oxalic acid, etc.; acid salts, e.g., ammonium chloride or sulphate, mono sodium phosphate and the like. The amount of acid catalyst conventionally employed ranges from about 0.02 to about 5% by weight of the composition and usually about 0.1 to 1% is the preferred range.

Along with these acid catalysts, I prefer to include an amount of an inhibitor such as hexamine whose presence appears to inhibit any premature activity of the catalyst prior to the time the composition is molded. Not only does the hexamine stabilize the molding composition against premature conversions during any storage period but it is also believed effective in minimizing any advancement or conversion of the thermoset resinous ingredient of the molding composition during any step in the preparation thereof wherein elevated temperatures are experienced. The amount of inhibitor, such as hexamine, ranges from about 0.5 to 2% based on the molding composition.

The amino-aldehyde condensates which constitute the molding compounds of the compositions to which this invention is directed are the reaction products of an aldehyde and an amidogen. The term "amidogen" employed herein contemplates those compounds containing one or more amino, amido, imino or imido radicals, or combinations of same, which compounds individually or in admixtures with other of this class will react with an aldehyde to yield potentially thermoset condensates thereof.

Representative of a class of these compounds are those which may be characterized as acyclic type of amidogens, that is, those amidogens wherein the aforesaid aldehyde reactable lagans are substituents of carbon atoms which are not part of any type of ring structure. Illustrative of the acyclic type amidogens are the following: an ureide, e.g., urea, thiourea, ethylurea, etc.; a biguanide, e.g., guanylguanidine, phenylbiguanide, etc.; a polyamide, e.g., adipamide, fumaramide, tartramide, phenylimino diacetamide, etc.; a diureide, e.g., ethylene diurea, oxybisethyleneurea, 2-hydroxyl propylene diruea, etc.; a diurethane, e.g., ethylene glycol dicarbamate, diethylene glycol biscarbamate, etc.; dicyandiamide; biuret; dicyandiamidine; and the like. The amidogen can be varied over a wide range depending, for example, upon the number of aldehyde-reactable lagans contained by the amidogen and upon particular properties desired in the final condensation product. The aldehyde, for example, formaldehyde, can be used in an amount sufficient to react with from one to all of the reactive hydrogens of the aforesaid nitrogen containing radicals of the amidogen. Thus, for example, from 1 to 6 moles of the aldehyde per mole of amidogen may be used when the latter consists of melamine. Similarly, when either benzoguanamine or urea is employed, 1 to 4 moles of aldehyde per mole of said amidogens can be used. The preferred proportions vary with the specific amidogen that is reacted with the aldehyde. However, taking for example several of the more commonly used species of amidogens such as melamine, benzoguanamine or urea, the preferred ratio of aldehyde to the above stated triamino triazine is 1.0–3.0 and in case of the above mentioned diamido compound and the diamino triazine the preferred ratio of formaldehyde to amidogen is 1.0–2.0.

The initial condensation reaction between the aldehyde, specifically formaldehyde, and the amidogen may be carried out at normal or at elevated temperatures; at atmospheric, sub-atmospheric or super-atmospheric pressures, and under neutral, alkaline or acid conditions. In the preparation of the condensate, it is generally preferred that the polymerization and dehydration be effected under basic conditions in the range of pH 7.0–11.0 and more preferably in the range of pH 9.0–10.0 at a temperature from about 25° to 105° C. When it is desired to carry out the condensation under alkaline conditions, any substance yielding an alkaline aqueous solution may be used, for example, alkaline metal or alkaline earth metal oxides, hydroxides or salts thereof with weak acids. Specifically, one may use sodium, potassium or calcium hydroxide, sodium or potassium carbonate. Further one may use a mono-, di- or triamine, aqueous ammonia, etc., to effect alkaline conditions. Illustrative examples of the acid condensation catalysts that may be employed are organic and inorganic acids, e.g., hydrochloric, sulfuric, phosphoric, acetic, lactic, maleic, etc., or acid salts such as sodium acid sulfate, mono sodium phosphate, mono sodium phthalate, etc.

The condensation reaction between the amidogen and the aldehyde may be effected in a single-stage operation as exemplified in British Patent No. 673,742, wherein all the aldehyde to be employed is initially present with the amidogen. In the alternative, the condensation reaction may be carried out in multiple stages, that is, the aldehyde to be employed in the condensation reaction is added in fractional amounts of the total in separate stages. The said multiple-stage technique is disclosed in U.S. Patent No. 2,841,571.

The condensation reaction between the amidogen and aldehyde may be carried out in an aqueous or nonaqueous medium, however, the employment of a non-aqueous medium is preferred for the preparation of these resinous molding compounds. Suitable non-aqueous media are water-soluble alcohols, ketones and such polar materials as dimethyl formamide, dioxan, tetrahydrofurane and the like. The amino-aldehyde resins preferred for use in molding compositions are of the non-alkylated type; however, it may be desirable in some instances to use slightly alkylated condensates or combinations of the major portion of unalkylated and a minor portion of alkylated amino resins.

Formaldehyde or compounds engendering formaldehyde such as paraformaldehyde, hexamethylenetetramine and the like comprise the preferred aldehydic component in the preparation of the thermosetting condensates suitable for use in molding compositions. Nevertheless for certain applications it may be desirable to use aldehydes such as acetaldehyde, proprionaldehyde, butyraldehyde, acrolein, methacrolein, crotonaldehyde, benzaldehyde, furfural, etc., mixtures thereof or mixtures of formaldehyde with one or more of the above-mentioned aldehydes.

In order that the present invention may be more completely understood, the following examples are set forth in which all parts are parts by weight unless otherwise indicated. These examples are set forth primarily for the purpose for illustration and any specific enumeration of detail contained therein should not be interpreted as a limitation on the case except as indicated in the appended claims.

PREPARATION OF RESIN SYRUP A

A resinous molding compound comprising the condensate of formaldehyde and urea having a molar ratio of 2:1.5, respectively, was made in the following manner. Into a suitable reaction vessel equipped with a stirrer, thermometer and reflux condenser were charged 2250 parts of low methanol content Formalin (37% aqueous formaldehyde), 1255 parts of urea and 3.75 parts of zinc oxide. The initial pH of the reaction mixture was 6.8–7.1. The reaction mixture was heated with stirring to 46° C. in thirty minutes. The reaction was then carried out at 46°–50° C. until a reaction product containing a free formaldehyde content of 4.5–5.0% was obtained (approximately one hour), whereupon the reaction product was cooled to room temperature. The resin solids of the resulting syrup was 60%.

PREPARATION OF RESIN SYRUP B

An amino resin molding compound constituting the condensation product of formaldehyde with melamine wherein the mol ratio of formaldehyde to melamine was 1.33 is prepared as follows. Into a suitable reaction vessel equipped with a stirrer, thermometer and reflux condenser were charged 2279 parts demineralized water, 1000 parts of a 37% aqueous solution of formaldehyde (Formalin) and sufficient quantity of ½ N sodium hydroxide solution to effect an alkaline condition of pH 8.6. Thereupon, 1197 parts of melamine were added. Heat was then applied, and with stirring the reaction medium was raised from room temperature to 98–102° C. in approximately one hour. The reaction mixture was heated at reflux (98–102° C.) until a standard condition of hydrophobicity was obtained which is indicated when four drops of the reaction medium when added to 25 milliliters of water at 0–3° C. resulted in a solution having a blue haze. Thereupon, the resinous syrup was cooled to approximately 65° C. and vacuum concentrated at 23 inches vacuum (approximately 7″ Hg pressure) until 1946 parts of water were removed, thus resulting in a resinous syrup having 66% resin solids.

*Example 1*

A molding composition was prepared from the following ingredients:

| | Parts |
|---|---|
| Resinous syrup A | 1700 |
| Chopped alpha cellulose pulp | 400 |
| Surfactant [1] | 2.2 |
| Hexamine | 12.6 |
| Phthalic anhydride | 2.0 |
| Zinc stearate | 4.3 |
| Lithopone | 70 |
| Violet pigment (phosphotungstic acid toner) | 0.02 |
| Yellow pigment | 0.01 |

[1] Reaction product of 9 mols of ethylene oxide with one mol of isononyl phenoxyethyl.

In compounding the above ingredients, the resinous syrup A was initially charged to a pre-warmed mixer. The mixer rotors were then started and heating to 120° F. was commenced. The hexamethylene tetramine dissolved in 150 parts of water was then added to the resinous syrup followed by addition of the surfactant. To the material constituting the mixer charge at this point were added the pigments, dye, zinc stearate and catalyst. The resultant mixer charge was allowed to mix from 3 to 5 minutes, thereupon the alpha cellulose which had been reduced in size to approximately ³⁄₃₂ inch by cutting with an Abbe cutter, was added to complete the mixer charge.

While in this instance the various additives including the pigments, dye, zinc stearate and catalyst were individually added, a more preferable procedure comprises preliminarily preparing a master batch of these ingredients by ball-milling for about 2 to 3 hours and then adding a necessary aliquot amount of the master batch to the mixer charge.

After the mixture had been mixed for approximately 10 minutes, a pressure lid was fitted on the mixer and mixing continued for an additional 30 minutes. The temperature of the ingredients in the mixer during the aforesaid 30 minutes' mixing time was 120°–125° F. After the mixing period the pressure lid was removed and the rotation of the blades was reversed for 30 seconds to fluff up the mix. The mixture was then screened through a 2½″ mesh screen.

Drying of the mixed material was conducted in a standard circulating air type dryer. The temperature pattern for the dryer was as follows:

| Zone | 1 | 2 | 3 |
|---|---|---|---|
| | ° F. | ° F. | ° F. |
| Dry Bulb | 180 | 180 | 180 |
| Wet bulb | 115 | 115 | 98 |

The material proceeded through the dryer on an endless belt at a cake thickness of approximately 2 inches. The total residence time in the dryer was approximately 80 minutes.

The popcorn emerging from the dryer had the following characteristics:

| | |
|---|---|
| Percent volatile | 5.8–6.2 |
| Flow-mold-flow (inches) | 0.044–0.049 |
| Tons to close | 18–20 |

Both the flow-mold-flow and tons to close data are indicative of the plasticity characteristics of the composition in the popcorn stage.

The flow-mold-flow rating is determined by charging 50 grams of the dried material at 20–30° C. to the center of the bottom platen of a molding press, both platens of which are at a temperature of 290+2° F. and soshaped and grooved as to produce a flat molded disk with concentric ridges ½" apart. The press is closed in 20 seconds with a force of 18 tons applied in about 15 seconds and maintained during the cure time. At the end of the time required for cure, the piece is removed and cooled. The average measurement of the thickness taken in the ring, about 2¼" from the center of the molded disk is recorded in mils or inches as the measure of plasticity. According to this test, a value in the range from about 40 to 50 mils is considered as indicating a desired degree of plasticity for a molding composition of the type to which this example pertains.

The tons to close figure given hereinabove is another test which serves to indicate the general molding behavior of the molding composition. In this test, the sample of the molding composition is molded in a tumbler mold and the number of tons pressure required to close the mold is determined. According to this test, a value in the range of from about 18–20 tons is generally regarded as indicating that the composition will exhibit proper molding behavior.

To complete the preparation of the molding composition, the dry material was then densified and cut to granular size. The densification was accomplished through the use of a standard Colton single stroke preformer. The specific gravity of the densified material range between about 1.0 and 1.2. Granulating to size was done with a Stokes oscillator type granulator. The apparent density of the material leaving the granulator was approximately 0.5.

A molded radio cabinet housing was prepared from the molding composition of this example. A straight close molding cycle was used for this purpose and the conditions of the molding operation were: three minutes at 300° F. at 2500 p.s.i. employing a closing time of 10 seconds. The resultant housing exhibited excellent surface appearance, that is, the color uniformity of the exterior surfaces of the housing was uniform and compared almost identically with a housing prepared from a molding composition of like formulation produced by the conventional method for compounding the ingredients employing a ball mill.

*Example 2*

A molding composition comprising the components given in Example 1, except with regard to the particular surfactant employed therein, was made in an identical manner as used to prepare the composition of said example. In the instant example, in the place of the surfactant of Example 1, there was substituted a like amount of the reaction product of 15 mols of ethylene oxide with 1 mol of tall-oil fatty acids. The molding composition prepared in this manner was compared with an identical composition prepared by the conventional ball mill method outlined herein before. The moldings prepared from these compositions in this example were of the flat disk type having a diameter of approximately 4 inches and a thickness of approximately ⅛ inch. The molding conditions employed for each composition consisted of a temperature of 155° C. for a period of five minutes and at a pressure of 1200 p.s.i. The surface appearance and color uniformity for both test moldings were comparable and of the necessary standard required for decorative moldings.

*Example 3*

A molding composition in accordance with this invention was made from resinous syrup B in the following manner. To a pre-warmed mixer were charged 900 parts of resinous syrup B and 2 parts of a wetting agent comprising the reaction product of 15 mols of ethylene oxide and 1 mol of tridecanol. The mixer rotors were started and thereupon 45 parts of Albalith, 2 parts of Chrome green dark, 3.5 parts glycerol mono stearate, and 1 part phthalic anhydride were added to the resinous syrup. After mixing these ingredients for approximately five minutes, 300 parts of alpha cellulose, which had been hammer-milled to a size corresponding to 60 mesh, were added to the mixer. Heat was applied to the mixer while stirring and a temperature of 125° F. for the ingredients was reached in ten minutes. A pressure lid was applied to the mixer and mixing at 125° F. was continued for a period of forty minutes. The material from the mixer was tray dried at a cake thickness of approximately 2 inches at a temperature of 70° C. until the free moisture content was 5.0%. The dried material was then densified by passing it through densifying differential rolls which had been adjusted to a predetermined tension and spaced at such a distance apart that the material, as it passed through the rolls, formed a substantially self-sustaining loosely compacted sheet. In a densifying operation as employed herein the density of the sheet is regulated by the amount of pressure applied to the rolls. The densified material as it left the roll was cut to granular size employing a Stokes oscillator type granulator and emerged in granular form having an apparent density of 0.6.

The composition of this example was used to mold a 6 inch diameter bowl having a 2 inch draw. Molding compositions of 300° F. at a pressure of 5000 p.s.i. at a holding time of five minutes were employed to yield a properly cured article. The color uniformity and surface appearance of the molding made as described were excellent.

I claim:

1. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of an aldehyde and an amidogen selected from the group consisting of melamine, urea, and benzoguanamine, and (4) pigment; drying the resulting mixture to a volatile content of less than about 8%; densifying the dried mixture; and granulating the densified material.

2. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of an aldehyde and urea, and (4) pigment; drying the resulting mixture to a volatile content of less than about 8% densifying the dried mixture; and granulating the densified material.

3. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of an aldehyde and melamine, and (4) pigment; drying the resulting mixture to a volatile content of less than about 8%; densifying the dried mixture; and granulating the densified material.

4. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of an aldehyde and benzoguanamine, and (4) pigment; drying the resulting mixture to a volatile content of less than about 8%; densifying the dried mixture; and granulating the densified material.

5. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of formaldehyde and urea, and (4) pigment; drying the resulting mixture to a volatile content of less than about 8%; densifying the dried mixture; and granulating the densified material.

6. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of formaldehyde and melamine, and (4) pigment; drying the resulting mixture to a volatile content of less than about 8%; densifying the dried mixture; and granulating the densified material.

7. A process for preparing a decorative molding composition which comprises: homogeneously mixing (1) a non-ionic wetting agent, (2) a cellulosic filler, in an amount which constitutes less than a major proportion of said decorative molding composition, (3) an aqueous syrup of a thermosetting condensate of formaldehyde and benzoguanamine, and (4) pigment; drying the resulting mixture to a volatile content of less than about 8%; densifying the dried mixture; and granulating the densified material.

8. A process for preparing a decorative molding composition which comprises: homogeneously mixing (1) a non-ionic wetting agent obtained by condensing an alkylene oxide with a material selected from the group consisting of an alkyl phenol, essentially saturated fatty acids containing in excess of about 10 carbon atoms, a higher alcohol containing in excess of about 10 carbon atoms, a fatty amine, and a mono-fatty acid ester of a polyhydric alcohol wherein the fatty acid contains in excess of about 10 carbon atoms, (2) a cellulosic filler, in an amount which constitutes less than a major proportion of said decorative molding composition, (3) an aqueous syrup of a thermosetting condensate of an aldehyde and an amidogen selected from the group consisting of melamine, urea, and benzoguanamine, and (4) pigment; drying the resulting mixture to a volatile content of less than about 8%; densifying the dried mixture; and granulating the densified material.

9. A process for preparing a decorative molding composition which comprises: homogeneously mixing (1) a non-ionic wetting agent obtained by condensing an alkylene oxide with a material selected from the group consisting of an alkyl phenol, essentially saturated fatty acids containing in excess of about 10 carbon atoms, a higher alcohol containing in excess of about 10 carbon atoms, a fatty amine, and a mono-fatty acid ester of a polyhydric alcohol wherein the fatty acid contains in excess of about 10 carbon atoms, (2) a cellulosic filler, in an amount which consitutes less than a major proportion of said decorative molding composition, (3) an aqueous syrup of a thermosetting condensate of formaldehyde and urea, and (4) pigment; drying the resulting mixture to a volatile content of less than about 8%; densifying the dried mixture; and granulating the densified material.

10. A process for preparing a decorative molding composition which comprises: homogeneously mixing (1) a non-ionic wetting agent obtained by condensing an alkylene oxide with a material selected from the group consisting of an alkyl phenol, essentially saturated fatty acids containing in excess of about 10 carbon atoms, a higher alcohol containing in excess of about 10 carbon atoms, a fatty amine, and a mono-fatty acid ester of a polyhydric alcohol wherein the fatty acid contains in excess of about 10 carbon atoms, (2) a cellulosic filler, in an amount which constitutes less than a major proportion of said decorative molding composition, (3) an aqueous syrup of a thermosetting condensate of formaldehyde and melamine, and (4) pigment; drying the resulting mixture to a volatile content of less than about 8%; densifying the dried mixture; and granulating the densified material.

11. A process for preparing a decorative molding composition which comprises: homogeneously mixing (1) a non-ionic wetting agent obtained by condensing an alkylene oxide with a material selected from the group consisting of an alkyl phenol, essentially saturated fatty acids containing in excess of about 10 carbon atoms, a higher alcohol containing in excess of about 10 carbon atoms, a fatty amine, and a mono-fatty acid ester of a polyhydric alcohol wherein the fatty acid contains in excess of about 10 carbon atoms, (2) a cellulosic filler, in an amount which constitutes less than a major proportion of said decorative molding composition, (3) an aqueous syrup of a thermosetting condensate of formaldehyde and benzoguanamine, and (4) pigment; drying the resulting mixture to a volatile content of less than about 8%; densifying the dried mixture; and granulating the densified material.

12. A process for preparing a decorative molding composition which comprises: homogeneously mixing (1) a non-ionic wetting agent obtained by condensing ethylene oxide with an alkyl phenol, (2) a cellulosic filler, in an amount which constitutes less than a major proportion of said decorative molding composition, (3) an aqueous syrup of a thermosetting condensate of formaldehyde and urea, and (4) pigment; drying the resulting mixture to a volatile content of less than about 8%; densifying the dried mixture; and granulating the densified material.

13. A process for preparing a decorative molding composition which comprises: homogeneously mixing (1) a non-ionic wetting agent obtained by condensing ethylene oxide with an alkyl phenol, (2) a cellulosic filler, in an amount which constitutes less than a major proportion of said decorative molding composition, (3) an aqueous syrup of a thermosetting condensate of formaldehyde and melamine, and (4) pigment; drying the resulting mixture to a volatile content of less than about 8%; densifying the dried mixture; and granulating the densified material.

14. A process for preparing a decorative molding composition which comprises: homogeneously mixing (1) a non-ionic wetting agent obtained by condensing ethylene oxide with an alkyl phenol, (2) a cellulosic filler, in an amount which constitutes less than a major proportion of said decorative molding composition, (3) an aqueous syrup of a thermosetting condensate of formaldehyde and benzoguanamine, and (4) pigment; drying the resulting mixture to a volatile content of less than about 8%; densifying the dried mixture; and granulating the densified material.

15. A process for preparing a decorative molding composition which comprises: homogeneously mixing (1) a non-ionic wetting agent obtained by condensing ethylene oxide with nonyl phenoxyethyl, (2) a cellulosic filler, in an amount which constitutes less than a major proportion of said decorative molding composition, (3) an aqueous syrup of a thermosetting condensate of formaldehyde and urea, and (4) pigment; drying the resulting mixture to a volatile content of less than about 8%; densifying the dried mixture; and granulating the densified material.

16. A process for preparing a decorative molding composition which comprises: homogeneously mixing (1) a non-ionic wetting agent obtained by condensing ethylene oxide with nonyl phenoxyethyl, (2) a cellulosic filler, in an amount which constitutes less than a major proportion of said decorative molding composition, (3) an aqueous syrup of a thermosetting condensate of formaldehyde and melamine, and (4) pigment; drying the resulting mixture to a volatile content of less than about 8%; densifying the dried mixture; and granulating the densified material.

17. A process for preparing a decorative molding composition which comprises: homogenously mixing (1) a non-ionic wetting agent obtained by condensing ethylene oxide with nonyl phenoxyethyl, (2) a cellulosic filler, in an amount which constitutes less than a major proportion of said decorative molding composition, (3) an aqueous syrup of a thermosetting condensate of formaldehyde and benzoguanamine, and (4) pigment; drying the resulting mixture to a volatile content of less than about 8%; densifying the dried mixture; and granulating the densified material.

References Cited in the file of this patent

UNITED STATES PATENTS 2,737,179    Dahle   ---------------- Mar. 6, 1956

FOREIGN PATENTS 675,818    Great Britain ------------ July 16, 1952
785,976    Great Britain ------------ Nov. 6, 1957

OTHER REFERENCES

Schwartz et al.: "Surface Active Agents and Detergents," volume II, page 668 (1st full paragraph), 1958, Interscience Publishers Inc., New York, New York.

UNITED STATES PATENT OFFICE
CERTIFICATE OF CORRECTION

Patent No. 3,026,277                          March 20, 1962

Joseph I. Gerko

It is hereby certified that error appears in the above numbered patent requiring correction and that the said Letters Patent should read as corrected below.

Column 3, line 41, for "0.5" read -- .05 --; column 10, line 48, after "8%" insert a semicolon.

Signed and sealed this 24th day of September 1963.

(SEAL)
Attest:

ERNEST W. SWIDER
Attesting Officer

DAVID L. LADD
Commissioner of Patents